United States Patent [19]

Ishida et al.

[11] Patent Number: 4,469,419
[45] Date of Patent: Sep. 4, 1984

[54] ELECTRONIC FLASH DEVICE

[75] Inventors: Tokuji Ishida, Daito; Hiroshi Hosomizu, Sakai, both of Japan

[73] Assignee: Minolta Camera Kabushiki Kaisha, Osaka, Japan

[21] Appl. No.: 418,210

[22] Filed: Sep. 15, 1982

[30] Foreign Application Priority Data

Sep. 16, 1981 [JP] Japan .................. 56-146932

[51] Int. Cl.³ .................. G03B 15/05; G03B 17/18
[52] U.S. Cl. .................. 354/127.1
[58] Field of Search .............. 354/33, 34, 60 F, 60 L, 354/53, 145, 139, 149, 289, 416, 417, 418, 127.1, 127.11, 127.12; 315/133, 134, 136, 151, 241 P

[56] References Cited

U.S. PATENT DOCUMENTS

| | | | |
|---|---|---|---|
| 4,086,582 | 4/1978 | Kiyohara et al. | 354/33 |
| 4,189,219 | 2/1980 | Hasegawa et al. | 354/33 |
| 4,295,717 | 10/1981 | Kitagawa | 354/33 |
| 4,300,825 | 11/1981 | Kitaura et al. | 354/34 |
| 4,309,092 | 1/1982 | Kitagawa | 354/33 |
| 4,340,284 | 7/1982 | Ohtsubo et al. | 354/50 |
| 4,349,260 | 9/1982 | Ishida et al. | 354/145 |
| 4,363,542 | 12/1982 | Kondo et al. | 354/31 |
| 4,367,023 | 1/1983 | Ishida et al. | 354/33 |
| 4,367,932 | 1/1983 | Ishikawa et al. | 354/23 D |

Primary Examiner—Michael L. Gellner
Assistant Examiner—Douglas S. Lee
Attorney, Agent, or Firm—Watson, Cole, Grindle & Watson

[57] ABSTRACT

In a flash photography system wherein an electronic flash is fired to illuminate an object to be photographed, a light measuring circuit measures the light reflected from the object and generates a stop signal when the integration of the measured light attains a given level, and the flash firing is interrupted in response to the stop signal, an indication is made when the stop signal is generated within a predetermined period from the generation of a synchro signal for firing the flash tube in conjunction with shutter opening, the period is longer than the period required for the flash tube to fully emit its light, i.e. consuming fully the charge stored in the main capacitor. The period may be approximately equal to or a litter longer than a maximum flash synchronizable shutter speed. Thus, there is an indication that a proper flash photography has been made, not only when the flash firing is interrupted before the flash tube has emitted the light fully, but also when a proper exposure is attained after the full light emission of the flash tube.

8 Claims, 7 Drawing Figures

ELECTRONIC FLASH DEVICE

BACKGROUND OF THE INVENTION

1. Field of the Invention

The present invention relates to an electronic flash device in which the amount of light emitted therefrom can be controlled, and more particularly relates to such an electronic flash device which stops its light emission in response to a signal supplied from a camera when the integration of the light reflected from a film being exposed reaches a given value.

2. Description of the Prior Art

To make more convenient flash photography with an electronic flash device (referred to as strobe hereinafter) that stops its light emission in response to a stop signal supplied from a camera, a flash photography system has been proposed wherein, when a desired amount of light has been reached to generate the stop signal and stop the light emission of the flash tube before the flash tube has fully or entirely emitted its light, a specific indicating element arranged to be seen in the camera viewfinder field is energized intermittently or continuously to indicate to the user that the flash photography at that time has been made properly within the capacity of the strobe to provide a desired amount of exposure.

The present invention improves the strobe used in such a flash photography system. As is well known in the art, the shutter speed must be set to a flash synchronizable value e.g. 1/60 second or less for flash photography with a focal plane shutter camera. The flash tube of a strobe emits light for about 1 millisecond at the most which is considerably shorter than the flash synchronizable shutter speed. Thus, in the photograph with the flash synchronizable shutter speed, the film is exposed to the light of a scene under the illumination of ambient light for the period the flash tube does not emit light. Accordingly, it sometimes possibly occurs that a proper exposure is obtained after the flash tube has emitted its light fully, i.e. after the main capacitor has been substantially discharged, with the scene light due to the ambient light illumination compensating for the shortage of the exposure by the flash light.

SUMMARY OF THE INVENTION

A general object of the present invention is to provide an improved strobe which can inform a camera of a sufficient exposure having been obtained with the flash light.

Another object of the present invention is to provide a strobe which generates a signal for driving an indication device in the camera not only when the flash light is interrupted in accordance with light measurement, but also when a proper exposure is obtained after the full light emission of the flash tube.

A further object of the present invention is to provide a system for a camera and a strobe which makes an indication in the camera when the flash tube is fired and a proper exposure is obtained by an automatic flash duration control device.

A further object of the present invention is to enable an indication to be made in such a system mentioned above when a proper exposure has been obtained with the strobe having emitted its light, consuming all the charge in the main capacitor.

A strobe according to the present invention is adapted to be used with a camera which includes a light receiving element or photocell receiving light reflected from the film surface being exposed to a scene light, and means for supplying a flash stop signal to the strobe when the amount of the light received by the light receiving element reaches a given level. In response to the flash stop signal from the camera, the strobe stops firing. The strobe includes a signal generator which supplies an indication drive signal to the camera when the strobe receives the flash stop signal within a predetermined period, (for example, by the time of shutter closure,) from the closure of the synchro switch in the camera. The camera energizes continuously or intermittently a specific indicator element in response to the indication drive signal from the strobe. Thus, indication is made when a desired amount of exposure is obtained, even if the strobe has emitted its light fully without its firing being interrupted.

According to the present invention, indication of suitable flash exposure is made not only when the flash light from the strobe is interrupted and the amount of flash light is automatically controlled before the main capacitor is discharged fully, but also when a suitable exposure is obtained by the illumination of fully fired flash and ambient light. Thus, an indication is made whenever a proper exposure is obtained in flash photography, whereby the user can be provided with more appropriate information.

These and other objects, features and advantanges will become more apparent upon a reading of the following detailed description and appended drawings in which:

DETAILED DESCRIPTION OF THE EMBODIMENTS

Figure 1:
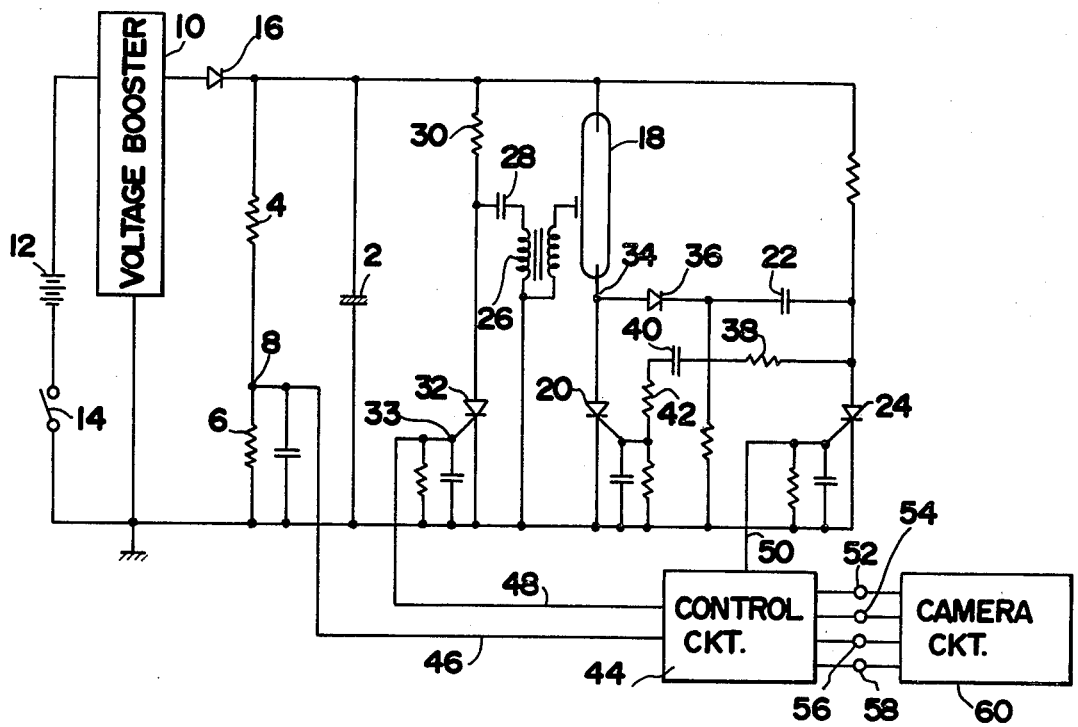
FIG. 1 is a circuit diagram of a strobe circuit according to an embodiment of the present invention.

First of all, the general operation of the embodiment will be described. With reference to FIG. 1, when main capacitor 2 for storing the electric energy for energizing flash tube 18 is charged above a given level, the voltage at node 8 between resistors 4 and 6 actuates a voltage detection circuit incorporated in later-to-be-described control circuit 44 so that the voltage detection circuit produces a detection output signal. In response to the detection output signal, a train of pulse signals having a frequency of 2 Hz (Hertz) are supplied through external terminal 52 to the camera circuit. In the camera circuit shown in FIG. 2, driver circuit 66 responds to the pulse signal to intermittently or periodically energize LED 68 arranged in the camera viewfinder, with a period of ½ second, thereby indicating the ready condition of the strobe wherein the main capacitor has been charged above the given level. The camera including light measuring circuit 80 is a focal shutter camera which measures the intensity of the light coming from an object to be photographed, passing through the camera objective and its diaphragm aperture and reflected from the film plane being exposed, and which supplies a "High" voltage through terminal 54 to the strobe when the integration of the measured light intensity reaches a given value. The "High" voltage serves to command the stopping of the firing of the flash tube. When shutter release operation is made, timing control circuit 62 in the camera generates a "High" voltage for a short time, e.g. 1 millisecond, during which transistor 64 conducts to provide terminal 52 with a "Low" voltage and terminal 54 a "High" voltage. The strobe circuit responds to that state of the camera circuit, detects the commencement of the shutter release operation and becomes ready for the subsequent operation.

When synchro switch 78 is closed after the commencement of exposure, flash tube 18 is triggered to begin its firing. When a proper exposure is attained with the light of the flash tube, light measuring circuit 80 generates a "High" voltage which is applied through terminal 54 to the strobe circuit wherein the "High" voltage is interpreted as a flash stop signal to stop the flash firing when the flash tube is being fired upon receiving the "High" voltage, and to produce a pulse signal having a frequency of 8 Hz at terminal 52 when the "High" voltage is received within a predetermined time period from the closure of the synchro switch. In response to the pulse signals, light emitting diode 68 is periodically turned on and off with a period of ⅛ second to indicate that a desired amount of exposure has been attained. The pulse signals of 2 Hz and 8 Hz alternate their levels between two levels, for example, 1 volt and 2 volts with the lower level not being zero DC voltage which switches the camera exposure time control circuit to a condition for providing a flash sychronizable shutter speed.

With reference to FIG. 1, main capacitor 2 is supplied with electric energy from power source battery 12 through voltage booster circuit 10 consisting of a DC-DC converter, and stores the energy produced therefrom. Flash tube 18 is serially connected with thyristor 20 which together with commutation capacitor 22 and the thyristor 24, forms a flash stop circuit. Trigger transformer 26, capacitor 28, resistor 30 and thyristor 32 together form a flash tube triggering circuit wherein, when thyristor 32 is applied with a "High" voltage at its gate, conducts to discharge capacitor 28 and trigger flash tube 18. When flash tube 18 is triggered, the potential at node 34 between flash tube 18 and the anode of thyristor 20 rises. The potential rise is transmitted through diode 36, capacitor 22, resistor 38, capacitor 40 and resistor 42 to the gate of thyristor 20, which conducts so that the electric charge stored in main capacitor 2 is discharged through flash tube 18.

Figure 2:
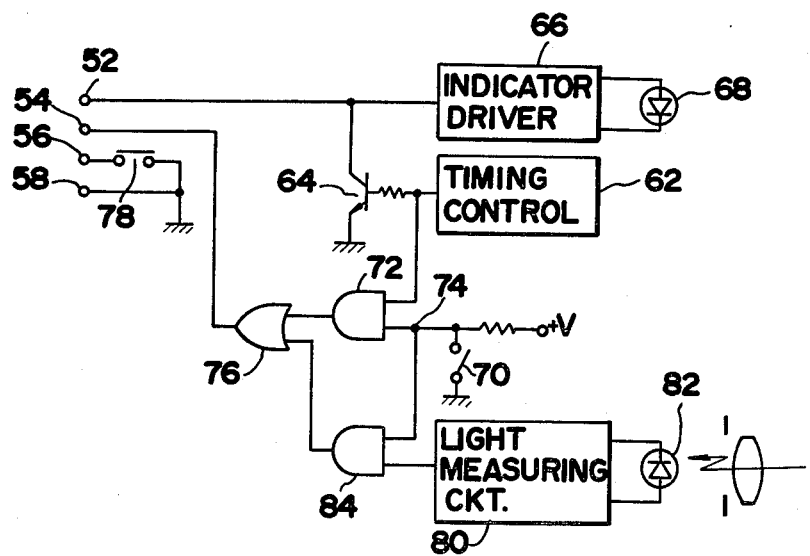
FIG. 2 is a circuit diagram of a relevant portion of a camera circuit to be coupled with the circuit shown in FIG. 1.

The operation of camera circuit 60 is described with reference to the circuit shown in FIG. 2. When the shutter release button is depressed to generate a shutter release command signal, timing control circuit 62 generates an output signal which renders transistor 64 conductive for a short time, for example, 1 millisecond, grounding terminal 52. Before the conduction of transistor 64, the strobe may have reached a charge completion state to supply through terminal 52 to driver circuit 66 a pulse signal of a rectangular waveform with the voltage alternating between 1 volt and 2 volts with a frequency of 2 Hz. In response to the pulse signal, LED 68 in the camera viewfinder is intermittently energized to indicate the charge completion state of the strobe. At this time, if the automatic flash light amount control mode has been selected, switch 70 is opened by the operation of a mode selection dial (not shown). Thus, upon conduction of transistor 64, AND gate 72 generates a "High" voltage which is applied through OR gate 76 and terminal 54 to the strobe.

Then, when the shutter is fully opened to close synchro switch 78 after the initiation of an exposure, flash tube 18 is triggered to begin its firing. While the flash tube 18 is emitting light, photodiode 82 included in light measuring circuit 80 receives the light reflected from the film surface being exposed and light measuring circuit 80 integrates the signal commensurate with the light received by photodiode 82 to generate a single pulse of a "High" voltage for the interruption of the flash firing when the integration attains a given value. In response to the flash interruption signal, the strobe circuit stops the firing of flash tube 18 and, at the same time, supplies for a given period, e.g. 1 second, a pulse signal of 8 Hz in place of the 2 Hz pulse signal, through terminal 52 to the camera circuit, wherein LED 68 is turned on and off in response to the pulse signal. Thus, the user, observing the flashing of LED at the higher frequency, can see that the flash light has been controlled to provide a proper exposure.

Figure 5:
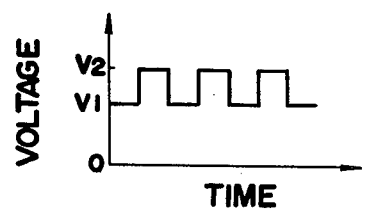
FIG. 5 is a graph showing the wave form of the output of the circuit shown in FIG. 4.

The construction and operation of the control circuit will now be described with reference to the circuit shown in FIG. 3. Input terminal 88 of voltage comparator circuit 86 is connected through lead line 46 of the circuit to node 8 (see FIG. 1) and is applied with a voltage corresponding to the charged voltage of main capacitor 2. When the voltage applied to input 88 exceeds a voltage Vo generated by voltage source 94, voltage comparator circuit 86 generates a "High" voltage output, which shows that main capacitor 2 has been charged sufficiently and the charging thereof has been completed. As will be described later, input terminal 106 of AND gate 102 receives a "High" voltage before the synchro switch is closed, so that AND gate 104 responds to the "High" voltage from voltage comparator circuit 86 to generate a "High" voltage output which causes transistor 100 to conduct. With the conduction of transistor 100, the potential at input terminal 90 of voltage comparator circuit 86 drops from reference voltage Vo to a voltage given by the voltage divider composed of resistors 96 and 98. Thus, voltage detection circuit 110 including voltage comparator circuit 86 is arranged to have a hysteresis characteristic. When synchro switch 78 is closed, input terminal 106 is applied with a "Low" voltage so that transistor 100 is blocked to release the hysteresis condition. The output terminal of voltage comparator circuit 86 is also connected to input terminal 114 of AND gate 112 whereby, before the closure of the synchro switch, the "High" voltage from voltage comparator circuit 86 is applied through AND gate 112, buffer circuit 120 and AND gate 122 to input terminal 132 of signal generator circuit 130 and to input terminal 140 of OR gate 138 as will be described later. In response to the "High" voltage, signal generator circuit 130 produces a pulse signal having a frequency of 2 Hz and assuming a voltage alternating between two non-zero levels as shown in FIG. 5.

Figure 3:
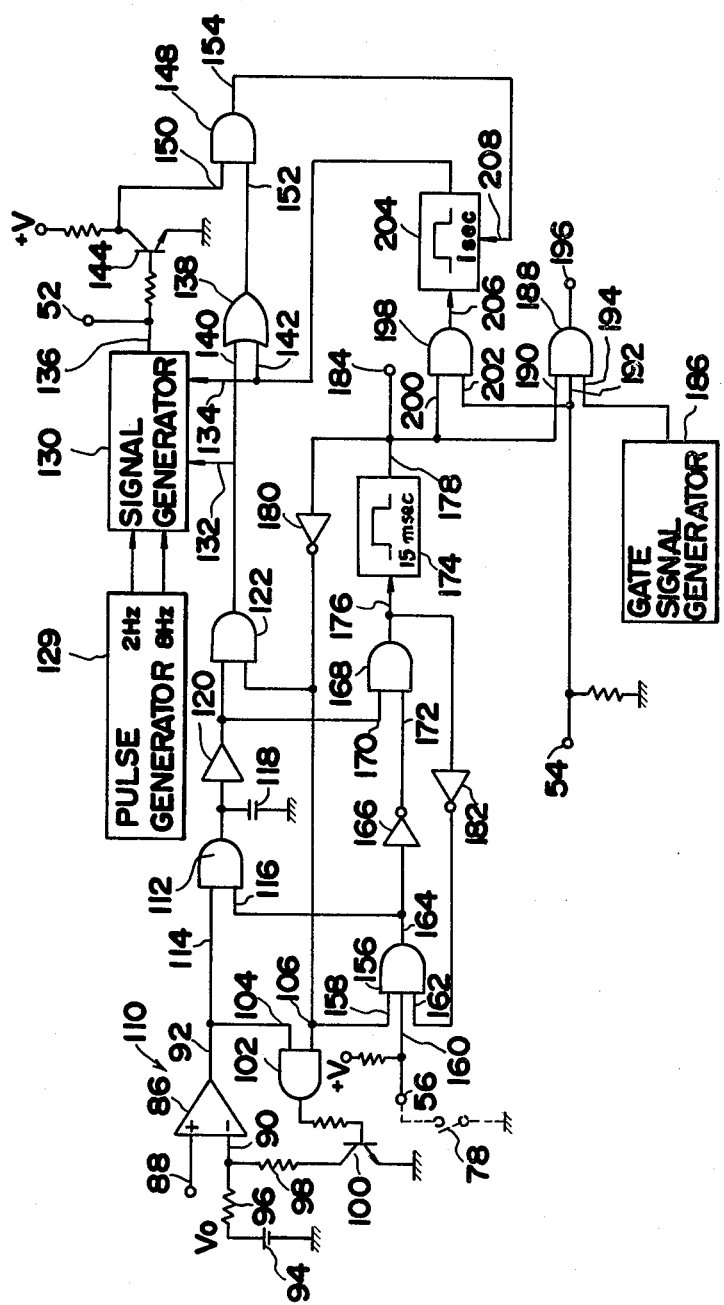
FIG. 3 is a circuit diagram showing an exemplary embodiment of control circuit block 44 in FIG. 1.
Figure 4:
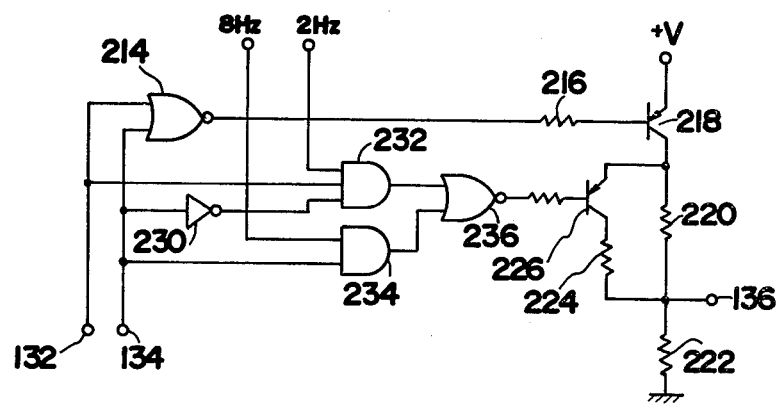
FIG. 4 is a circuit diagram showing an exemplary embodiment of a signal generation circuit 130 in FIG. 3.

The definite construction of signal generator circuit 130 is shown in FIG. 4. Terminals 132 and 134 are respectively connected to the input terminals of NOR gate 214 which has its output terminal connected through resistor 216 to the base of PNP transistor 218. When either one of terminals 132 and 134 receives a "High" voltage, NOR gate 214 generates a "Low" voltage output to conduct transistor 218. Between the collector of transistor 218 and a ground terminal is connected a load circuit composed of resistors 220, 222 and 224 and PNP transistor 226. At terminal 136 tapped from the load circuit is produced a voltage according to the voltage division by serially connected resistors 220 and 222 when transistor 226 is non-conductive with transistor 218 being conductive, and a voltage according to the voltage division by the ratio of the combined resistance of resistors 220 and 224 and the resistance of resistor 222 when transistor 226 is conductive. The circuit comprising inverter 230, AND gates 232 and 234 and NOR gate 236, selectively applies to the base of transistor 226 two kinds of pulse signals, 2 Hz and 8 Hz, which are provided from pulse generating circuit 129 in FIG. 3. The circuit selects the pulse signals in accordance with the signals applied to terminals 132 and 134. When terminals 132 and 134 are applied with "High" and "Low" signals respectively, AND gates 232 and 234 are respectively unblocked and blocked to select the pulse signal of 2 Hz which is output from NOR gate 236. When terminal 134 receives a "High" voltage, AND gate 232 is blocked and AND gate 234 is unblocked to preferentially generate the pulse signal of 8 Hz from NOR gate 236 regardless of the signal level at terminal 132. Thus, in accordance with the levels of input signal supplied to terminals 132 and 134, the pulse signal of 2 Hz or 8 Hz is selected to be generated at terminal 136 with the level of signals alternating between two levels neither of which is zero. Referring back to FIG. 3, the signal generated from signal generator circuit 130 in response to the charge completion of the main capacitor, makes transistor 144 conductive and its collector terminal changes to a "Low" voltage. Accordingly, AND gate 148 having input terminal 150 connected with the collector of transistor 144, generates a "Low" voltage output. Output terminal 154 of AND gate 148 is connected with reset input terminal 208 of one-shot circuit 204. Terminal 52, which applies pulse signals to the camera circuit, is grounded for 1 millisecond when transistor 64 (see FIG. 2) in the camera circuit is made conductive for that period in conjunction with a shutter release operation. The grounding of terminal 52 blocks transistor 144 so that its collector is at a "High" voltage. When the collector of transistor 144 is at a "High" voltage in response to the shutter release operation with input terminal 152 of AND gate 148 receiving a "High" voltage due to the charge completion in the strobe circuit, AND gate 148 generates a "High" voltage output which resets one-shot circuit 204. Thus, AND gate 148 generates a "High" voltage output in a corresponding relationship with the conduction of transistor 64 in the camera circuit.

The following is an explanation of the circuit preceding one-shot circuit 204. AND gates 156 and 168 and inverters 166 and 182 along with AND gate 112, capacitor 118 and buffer 120 form a circuit which generates a single pulse for triggering one-shot circuit 174 in response to the closure of synchro switch 78. Before the shutter release operation is made with the strobe circuit being in a charge completion state, AND gate 156 receives "High" voltages at all three terminals thereof so that AND gate 112 and buffer 120 generate "High" voltages. On the other hand, AND gate 168 is supplied with a "Low" voltage at its input terminal 172 from inverter 166, and generates a "Low" voltage. When synchro switch 78 is closed, AND gate 156 receives a "Low" voltage at its input terminal 160 and inverts its output from a "High" to a "Low" voltage. In response to that inverted output, input terminal 176 of AND gate 168 is immediately applied with a "High" voltage from inverter 166. On the other hand, receiving the "Low" voltage from AND gate 156, AND gate 112 and buffer 120 produce "Low" voltages for a little time (e.g. 5μ second) after the inversion of the output of AND gate 150 due to the delaying action of capacitor 118. During that delay time, AND gate 168 is supplied with "High" voltages at both input terminals 170 and 172 to generate a single pulse of "High" voltage which triggers one-shot circuit 174 to generate a "High" voltage for 15 milliseconds therefrom. Terminal 184 is connected to gate 33 of thyristor 32 in the circuit of FIG. 1. The "High" voltage from one-shot circuit 174 makes thyristor 32 to trigger flash tube 18. At the same time, the "High" voltage from one-shot circuit 174 is applied to input terminals 190 and 200 of AND gates 188 and 198. The other input terminals 192 and 202 of AND gates 188 and 198 are connected through terminal 54 to the camera circuit. Input terminal 194 of AND gate 188 is the output terminal of gate signal generator circuit 186 which generates a "High" voltage output only when flash tube 18 is being fired. Output terminal 196 of AND gate 188 is connected through lead line 50 to the gate of thyristor 24 in the circuit of FIG. 1. The output terminals of AND gate 198 are connected to input terminal 206 of one-shot circuit 204. In response to the "High" voltage from AND gate 198, one-shot circuit 204 generates, for 1 second, a "High" voltage which is applied to input terminals 142 and 134 of OR gate 138 and signal generator circuit 130. Thus, when a "High" voltage is supplied for 15 milliseconds from the camera circuit through terminal 54 to input terminal 202 of AND gate 198 while one-shot circuit 174 is triggered by the closure of synchro switch 78, AND gate 198 generates a "High" voltage to trigger one-shot circuit 204. In response to the "High" voltage from one-shot circuit 204, signal generator circuit 130 generates a pulse signal of 8 Hz which is received by the camera circuit to energize LED 68 intermittently for a period of ⅛ second.

Additionally, when a "High" voltage is supplied from the camera circuit to terminal 54, AND gate 188, in response thereto, generates a "High" voltage output. By this "High" voltage, thyristor 1 in the circuit of FIG. 24 is triggered to stop the firing of flash tube 18 in a manner well known in the art.

The general operation of the above described circuitry is as follows. When power switch 14 is closed, main capacitor 2 is charged towards a high voltage, by voltage booster circuit 10 until the charged voltage of main capacitor 2 exceeds a given value, e.g. 300 volts. Then the output of voltage comparator circuit 86 inverts to a "High" voltage which causes signal generator circuit 130 to generate a pulse signal of 2 Hz. In response to the pulse signal, the camera circuit energizes LED 68 intermittently with a period of ½ second to indicate that the strobe circuit has reached a charge completion state. Subsequently, when the shutter release operation is made, a signal from the camera circuit grounds terminal 52 for a short time whereby a "High"

voltage from AND gate 148 resets one-shot circuit 204. The reset of one-shot circuit 204 is intended for the later-to-be-described effect in the case where the shutter is cocked again and the shutter release operation is made during the time (for 1 second in the embodiment) while the one-shot circuit is producing a "High" level voltage.

When the shutter is released by a shutter release operation and opens fully to close synchro switch 78, one-shot circuit 174 is triggered to generate a "High" level voltage output for 15 milliseconds. In response to the "High" level voltage, flash tube 18 begins to emit its light to illuminate an object to be photographed. Light measuring circuit 80 in the camera receives with its photodiode 82 the light reflected from the film surface being exposed and integrates the photoelectric current commensurate with the intensity of the light received by photodiode 82 until the integration reaches a given value whereupon light measuring circuit 80 generates a "High" level voltage output as a proper exposure signal. When the "High" level voltage output is generated while flash tube 18 is emitting light, AND gate 188 generates a "High" level voltage to interrupt the firing of flash tube 18. At the same time, AND gate 198 generates a "High" level voltage to trigger one-shot circuit 204, which then generates a "High" level voltage for one second during which the camera circuit intermittently energizes LED 68 at a frequency different from that for the indication of the charge. Thus, LED 68 flickers or flashes to indicate that a proper exposure has been obtained. In the case when a "High" level voltage is applied to terminal 54 from the camera circuit after the flash tube 18 has emitted its light fully, i.e. after the main capacitor has been discharged fully, one-shot 204 can be triggered to effect the indication of a proper exposure if the "High" level voltage is produced while one-shot circuit 174 is generating a "High" level voltage. It is to be understood that the time of 15 milliseconds assigned to one-shot circuit 174 is approximately equal to the flash synchronizable minimum exposure time of the camera. Thus, according to the strobe of the present invention, a signal for the indication of a proper exposure is generated even when a proper exposure has been obtained with both the fully emitted flash light and ambient light illumination during the flash synchronizable exposure time. Accordingly, the present invention can provide a more reasonable indication in comparison with the conventional indication system which makes the indication of a proper exposure only when light emission of a flash tube is interrupted before it emits light fully.

The following description concerns the case where the film is wound up, the shutter is cocked and shutter release is commanded while the indication of a proper exposure with flash light is still continued. This case may occur when pictures are taken successively over a short period with a camera provided or coupled with a motor driven wind-up device. When a shutter release operation is made, a signal from the camera circuit grounds terminal 52 to apply a "High" level voltage to input terminal 150 of AND gate 148. If one-shot circuit 204 is generating a "High" level voltage at that time due to the preceding photographic operation, the "High" level voltage from one-shot circuit 204 is applied through OR gate 138 to input terminal 152 of AND gate 148, which, in response to the grounding of terminal 52, generates a "High" level voltage output to reset one-shot circuit 204. Thus, when the next photographic operation is initiated while one-shot circuit 204 is generating a signal for the indication of a proper or appropriate flash exposure, the signal generating operation of one-shot 204 is interrupted for the preparation of the next new photographic operation.

The above described proper exposure indication has been made when the shutter is controlled at the flash synchronizable minimum speed. Additionally, flash photography may be made with shutter speeds slower than the flash synchronizable minimum shutter speed, and such flash photography is sometimes made actually. Assume the case where an exposure is made with a shutter speed of one second. As the proper flash exposure indication signal is generated by the aforementioned circuit for about one second from the firing of the flash tube, the indication signal will disappear when the exposure of one second is terminated. If the indicating device is arranged not to make the indication in the camera viewfinder field during the exposure, the user can not see the proper flash exposure indication when the exposure is made with a shutter speed not less than one second. The second embodiment shown in FIG. 6 provides the means for enabling the proper flash exposure indication even in the case of long time exposure.

Figure 6:
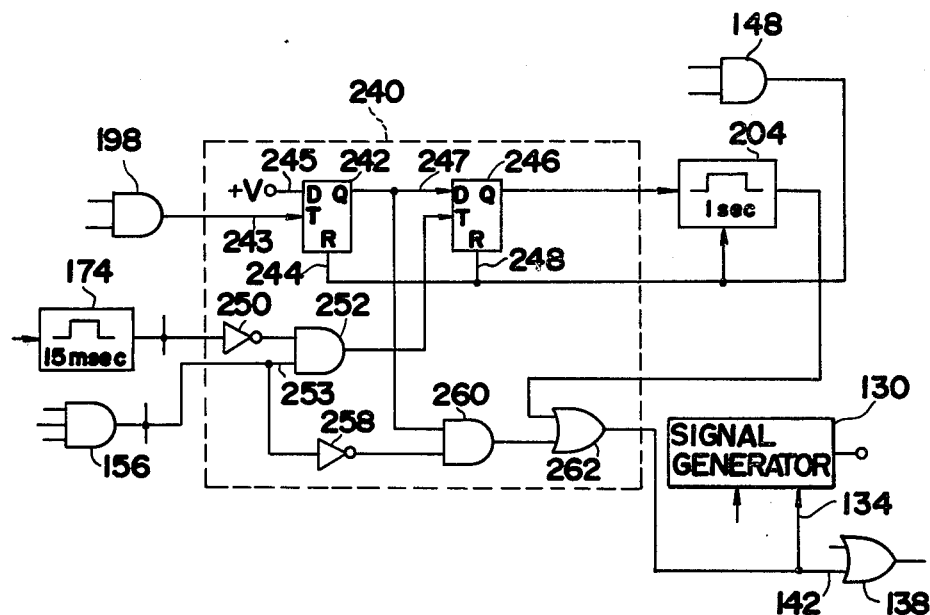
FIG. 6 is a circuit diagram showing a circuit to be added to the circuit of FIG. 3 for making an indication of a suitable exposure in the case of a long exposure.

Circuit 240 enclosed by a broken line in FIG. 6 is added for that purpose to the circuit of FIG. 3, with the other parts of FIG. 6 circuit being the same as the FIG. 3 circuit although only the parts related to circuit 242 are shown in FIG. 6. In circuit 240, when a proper exposure signal is generated from the camera circuit within 15 milliseconds from the closure of synchro switch 78, AND gate 198, in response thereto, generates a "High" level voltage and the generation of the "High" level voltage is memorized in D-flip-flop 242 so that when synchro switch 78 is opened in conjunction with the shutter closure i.e. termination of an exposure, one-shot 204 is triggered in accordance with the memory in D-flip-flop 204 to generate a proper flash exposure indication signal for one second from that time.

In circuit 240, D-flip-flops 242 and 246 have their reset terminals 244 and 248 connected to the output terminal of AND gate 148 to be reset by a "High" level output generated by AND gate 148 in response to a signal supplied from the camera circuit at an initial stage of a shutter release operation. D-input terminal 245 of flip-flop 242 is always supplied with a "High" level voltage. When AND gate 198 generates a "High" level voltage in response to a proper exposure signal from the camera circuit, flip-flop 242 is set by the "High" level voltage. The set output of flip-flop 242 is applied to D-input terminal 247 of flip-flop 246 and to one of the input terminals of AND gate 260. The other input terminal of AND gate 260 is connected through inverter 258 to the output terminal of AND gate 156, which in turn generates a "Low" level voltage output while synchro switch 78 is being closed. Accordingly, after flip-flop 242 has been set, inverter 258 generates a "High" level voltage and accordingly AND gate 260 also generates a "High" level voltage while synchro switch 78 is being closed. The "High" level voltage from AND gate 260 is supplied through OR gate 262 to input terminal 134 of signal generator circuit 132 and input terminal 142 of OR gate 138. In the case when a proper exposure signal is generated from the camera circuit, AND gate 260 generates a "High" level voltage which is applied through OR gate 262 to signal generator circuit 130 while synchro switch 78 is being closed i.e. while the shutter is open. Then after a lapse of 15 milliseconds from the closure of synchro switch 78, one-shot circuit 174 generates a "Low" level voltage output which is inverted by inverter 250 to a "High" level voltage, which in turn is applied to one of the input terminals of AND gate 252. With this condition, when the shutter is closed to open synchro switch 78 at that state, AND gate 252 receives a "High" level voltage also to the other input terminal 253 and generates a "High" level voltage output, which sets flip-flop 246.

The set output of flip-flop 246 triggers the one-shot circuit, 204 which generates a "High" level voltage for one second. The "High" level voltage is applied through OR gate 262 to signal generator circuit 130 to effect the proper flash exposure indication as described above. Thus, the circuit of FIG. 6 is constructed to make the proper flash exposure indication when the camera circuit produces a proper exposure signal within 15 milliseconds after the closure of synchro switch 78, even in the case of long exposure.

Figure 7:
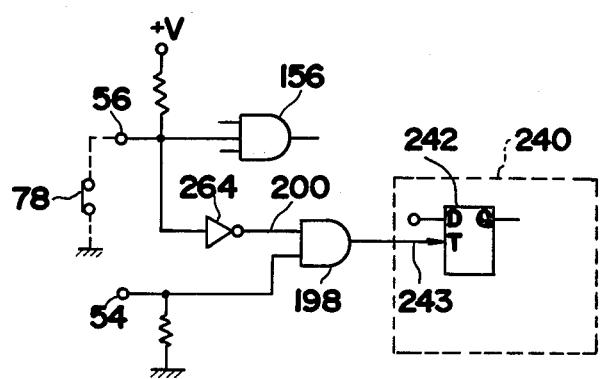
FIG. 7 is a circuit diagram showing another circuit for making an indication of a proper exposure while the camera synchro switch is closed.

The circuit of FIG. 7 is a further modification wherein the indication of the proper flash exposure is made when a proper exposure has been obtained within the period from the closure of synchro switch 78 to the opening of the same, regardless of the period given by one-shot circuit 174. The FIG. 7 circuit is obtained by modifying the FIG. 3 circuit in such a way that the connection between input terminal 200 of AND gate 198 and output terminal 178 of one-shot circuit 174 in FIG. 3 is disconnected, terminal 56 to be connected to synchro switch 78 is connected through newly provided inverter 264 to input terminal 200 of AND gate 198, and the output of AND gate 198 is connected to T-input terminal 243 of flip-flop 242 which is the same as shown in FIG. 6. With this arrangement, a "High" level voltage signal which represents a proper exposure having been obtained and which is supplied to terminal 56 from the camera circuit, is allowed to pass AND gate 198 while synchro switch 78 is being closed, i.e. while the camera shutter is open to effect film exposure. Thus, even in the case of a long exposure, the indication of the proper flash exposure is made, similarly as in the case of the FIG. 6 circuit, when a proper exposure has been obtained within an exposure time. It is to be understood that, although the indication of the proper flash exposure is made in the camera only in the above described embodiments, a similar indication may be made on the strobe.

Having described our invention as related to the embodiments shown in the accompanying drawings, it is our intention that the invention be not limited by any of the details of description, unless otherwise specified, but rather be construted broadly within its spirit and scope as set out in the accompanying claims.

What is claimed is:

1. Electronic flash device capable of being combined with a camera having a synchro terminal for transmitting a synchro switch closure signal for flash photography, comprising:

means for emitting flash light to illuminate an object to be photographed;

first means for storing electric power for the flash light emission;

means for initiating said flash light emission;

a first terminal connectable with the camera synchro terminal for actuating said initiating means upon appearance of said synchro switch closure signal at said synchro terminal;

means for terminating the flash light emission in response to attainment of a correct flash photograph;

second means for storing data representing attainment of a correct exposure for flash photography;

means for producing a detecting signal representing that an exposure operation in the camera is completed; and means for producing an information signal from said data in said second storing means that correct flash exposure has been obtained and in response to said detecting signal, said information signal existing for at least a predetermined time interval after said means for producing detects the completion of an exposure operation.

2. The electronic flash device as set forth in claim 1, further comprising means for indicating correct flash exposure for said predetermined time interval and responsive to said information signal.

3. The electronic flash device as set forth in claim 1, further comprising a second terminal connectable with the camera for transmitting said information signal to the camera for said predetermined time interval.

4. The electronic flash device as set forth in claim 3, further comprising means for generating a flash ready signal when the electric power stored in said first storing means is above a predetermined level, said flash ready signal appearing at said second terminal.

5. The electronic flash device as set forth in claim 4, wherein said flash ready signal is characterized by a first frequency, and said information signal is characterized by a second frequency.

6. The electronic flash device as set forth in claim 3, further comprising means for discontinuing the transmission of said information signal to the camera through said second terminal upon the appearance of a signal at said second terminal representative of initiation of a next exposure operation of the camera.

7. The electronic flash device as set forth in claim 1, wherein said means for producing a detecting signal is responsive to an opening of the synchro terminal sensed by the absence of said synchro switch closure signal at said first terminal to detect the completion of the camera exposure operation.

8. The electronic flash device as set forth in claim 1, further comprising a third terminal connectable with the camera for receiving a correct exposure signal representative of the attainment of the correct exposure, and wherein said second means for storing is connected to said third terminal, and means for initiating storage of the data in said second means for storing in response to the appearance of said correct exposure signal at said third terminal within a predetermined period of time beginning from the initiation of flash light emission.

* * * * *